Oct. 20, 1970   H. J. SCHWERDHOFER   3,534,629
CONTROL MECHANISM FOR A BICYCLE
Filed March 11, 1969   3 Sheets-Sheet 3
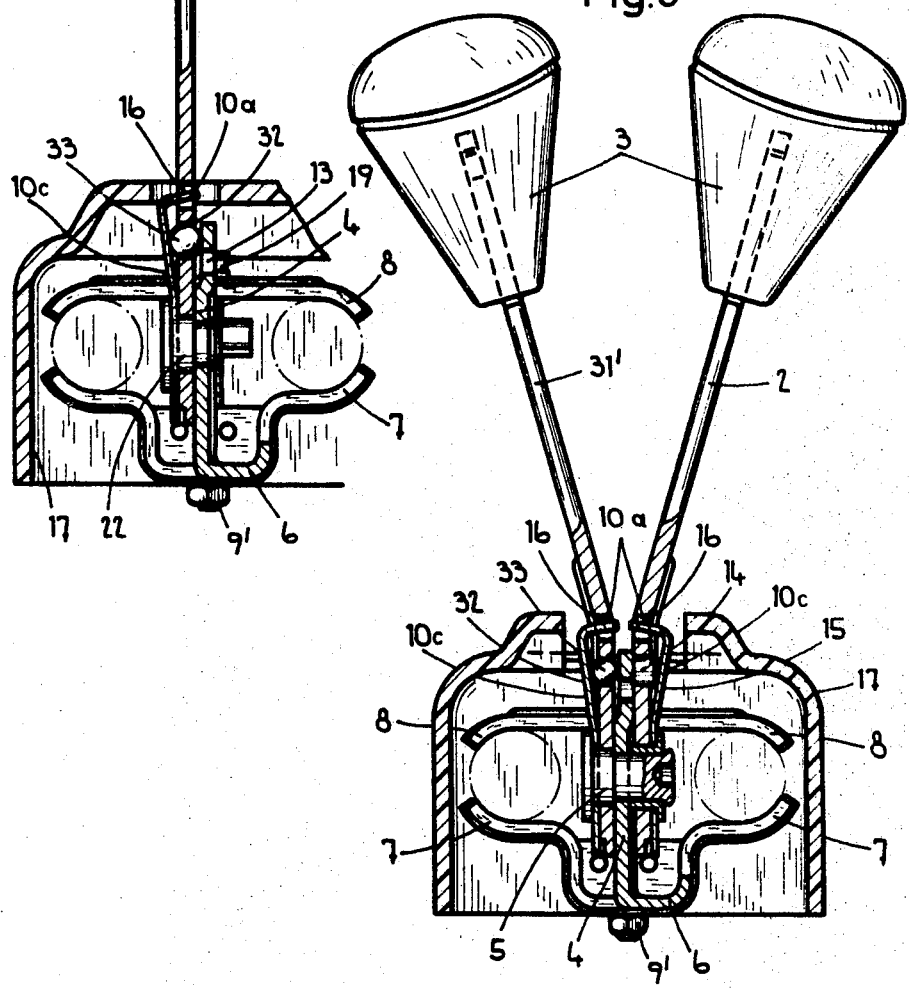
INVENTOR.
Hans Joachim Schwerdhöfer
By: Low and Berman
AGENTS 3,534,629
CONTROL MECHANISM FOR A BICYCLE
Hans Joachim Schwerdhofer, Schweinfurt (Main), Germany, assignor to Fichtel & Sachs AG, Schweinfurt (Main), Germany
Continuation-in-part of application Ser. No. 765,770, Oct. 8, 1968. This application Mar. 11, 1969, Ser. No. 806,260
Claims priority, application Germany, Dec. 4, 1968, 1,812,553; Oct. 14, 1967, F 33,007
Int. Cl. G05g 5/06
U.S. Cl. 74—535                                8 Claims

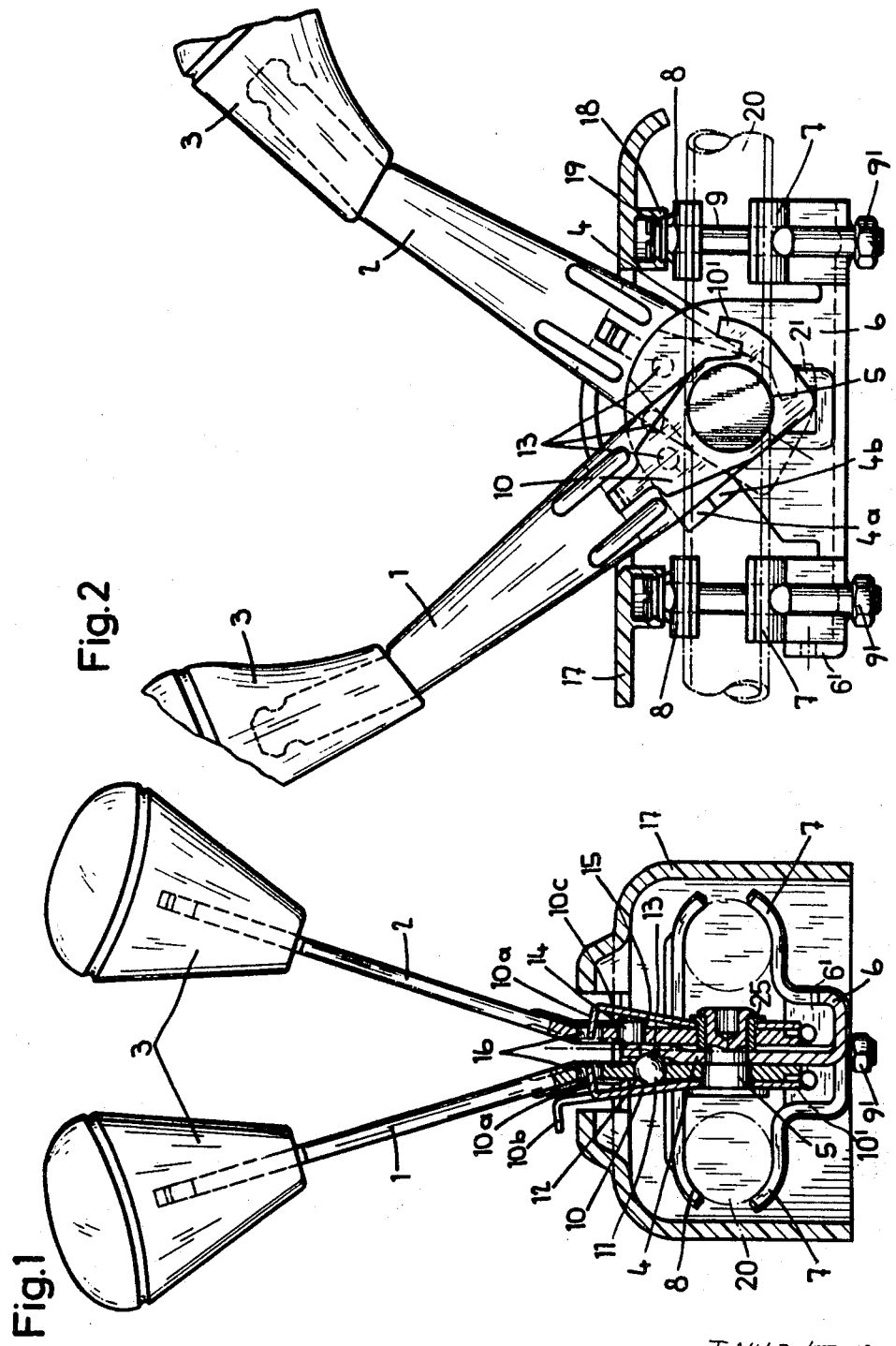

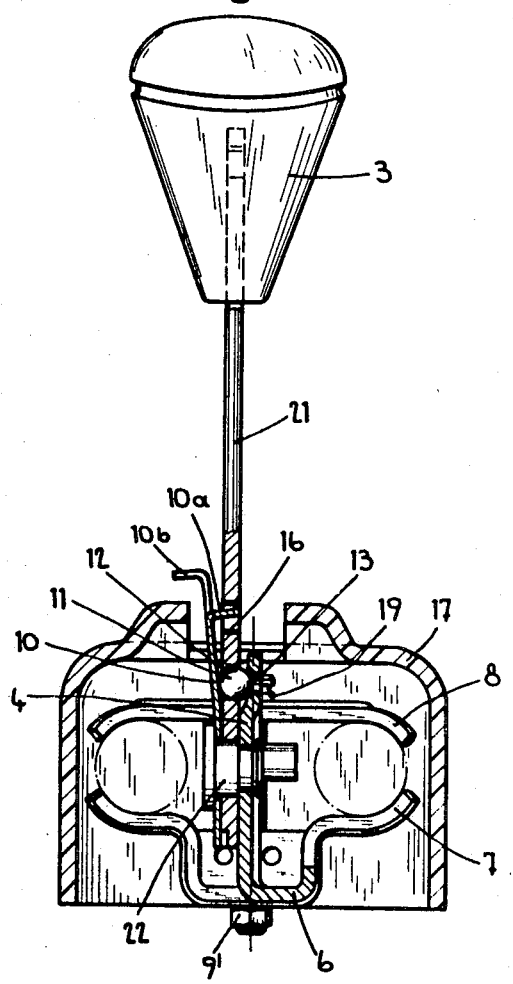

ABSTRACT OF THE DISCLOSURE

A control mechanism for mounting on a bicycle having dual top tubes has an upright supporting plate with a horizontal flange forming receptacles in which the two top tubes are held by clamps and screws. One or two control levers are mounted on the plate by means of a pivot pin and are held in desired angular positions by means of a clickstop mechanism or a spring-loaded friction element.

---

This application is a continuation-in-part of the copending application Ser. No. 765,770, filed on Oct. 8, 1968.

This invention relates to a speed-changing mechanism for the multiple-speed transmission of a bicycle or like vehicle having a tubular frame with dual, practically parallel top tubes.

As disclosed in the afore-mentioned earlier application, a speed-changing mechanism mounted on the fixed frame of a bicycle has advantages over a mechanism mounted on the handle bars, particularly when arranged so as not to project into the space needed for free movement of a rider's knees. The present invention provides an improvement over the earlier invention in the simplicity of its structure and in its versatility, as will presently become apparent, and is most suitable for bicycle frames having dual, parallel top tubes.

The control mechanism of this invention has a supporting plate which extends mainly in an upright plane when installed on a bicycle. A flange integral with the plate projects from the plane in opposite directions, and respective portions of the flange remote from the plane constitute receptacles for the two cylindrical top tubes of the bicycle frame which are clamped in the receptacles. A control lever is fastened to the supporting plate by means of a pivot pin and is axially secured relative to the plate. It is provided with a hook by means of which a Bowden cable or like elongated tension member may be attached to the lever for connecting the control mechanism of the invention to a multiple-speed transmission on the bicycle.

Other features and the attendant advantages of this invention will hereinafter become more fully apparent from the following description of the annexed drawings, which illustrate preferred embodiments, and wherein:

FIG. 1 shows a control mechanism of the invention in front-elevational section on the pivot axis of its control levers;

FIG. 2 shows the device of FIG. 1 in side-elevational section on its median plane; and FIGS. 3, 4, and 5 show modifications of the apparatus of FIG. 1 in corresponding views.

Referring initially to FIGS. 1 and 2, there is seen a control device of the invention equipped with a speed changing lever 1 and a brake actuating lever 2 whose free upper ends carry operating knobs 3. The two levers are narrow, originally flat steel plates whose parallel lower ends are attached on either side of a supporting plate 4 by a pivot pin 5 whereas the knob-bearing top ends are bent to diverge upwardly.

The plate 4 extends almost entirely in the upright median plane of the device which is perpendicular to the pivot axis of the pin 5. It is integral with a flange 6 which projects horizontally in two opposite directions from the median plane and forms a pair of aligned arcuate receptacles 7 on either side of the plane ahead of and behind plate 4. The receptacles of each pair are spaced in opposite directions from the axis of the pin 5 and are aligned to receive therein one of the two, almost parallel top tubes 20 of the bicycle frame shown in phantom view in the drawing. Two clamping bars 8 extend across the flange 6 and are attached to the flange by central bolts 9 and nuts 9' to hold the tubes 20 in the receptacles 8.

The pivot pin 5 is a hollow shoulder rivet having a flat head. The shoulder of the pin abuts against one face of the plate 4 whereas a flanged bushing 25 on the shaft of the pin abuts against the other face of the plate 4 and is held in place by the expanded tubular end of the pin. The flat head of the pin 5 axially secures the lever 1 and an associated leaf spring 10 which is rotatable on the pin. The lower end 10' of the spring 10 is hook-shaped, and the other end is forked and bent to form a lug 10a which extends axially into an aperture 16 in the lever 1 so that the spring 10 moves about the pivot axis with the lever. The top end of the spring 10 also forms a lug 10b bent axially away from the lever 1. Its function will presently become apparent.

A steel bearing ball 11 whose diameter is greater than the thickness of the lever 1 is held in a bore 12 of the lever by the spring 10 and is urged by the spring into frictional engagement with the plate 4. The plate has three recesses 13 arranged in a circular arc about the pivot axis for partly receiving the ball 11 in three corresponding angular positions of the lever 1 to provide click stops for the lever. An abutment 4a integrally projects from the plate 4 into the path of the lever 1 to prevent its angular displacement in one direction beyond the last click-stop.

The lever 2 is axially secured on the pin 5 by the flange of the bushing 25 together with another leaf spring 10c identical with the spring 10 except for the absence of the lug 10b. A lug 10a on the spring 10c engages an aperture 16 in the lever 2 as described above. The lower end 2' of the lever 2 has the same hook shape as the lower end of the spring 10c, and it will be understood that the lower end of the lever 1, not itself seen in the drawing, has the same configuration.

A pin 14 is slidably received in an axial bore 15 of the lever 2 which is radially offset from the arc of the recesses 13 in the plate 4. The pin 14 has a flat face which is held in frictional engagement with the plate 4 by the spring 10c. The pivoting movement of the lever 2 is thus impeded by the pin 14, and is limited by an abutment 4b similar to the afore-described abutment 4a.

The top ends of the levers 1, 2 carrying the knobs 3 project from a slot in a plastic cover 17 which is downwardly open, but envelops the other elements of the mechanism in an upward and lateral direction. Downwardly open cups 18 are integrally molded with the cover 17 just ahead and behind the slot in the latter in the median plane of the cover. They receive the heads of the clamping screws 9, and the cover 17 is releasably locked to the plate 4 and to the other normally stationary elements of the control mechanism by the rims of the cups 18 which resiliently engage annular grooves 19 in the heads of the screws 9.

In the normal intended use of the illustrated device, Bowden cables are attached to the hooks at the lower ends of the levers 1, 2 and on the associated leaf spring 10, 10c and are drawn through openings in a guide lug 6' to a three-speed hub of the bicycle and to a brake respectively. The hub is set for first, second, and third gear when the ball 11 engages the recesses 13 respectively. The brake is applied by turning the lever 2, and is held in the manually set position by the pin 14. Index marks, not shown, on the cover 17 near the slot in the top thereof are swept by the lug 10b during the pivoting movement of the lever 1 and indicate the speed for which the hub is set.

The mechanism shown in FIG. 3 has only one operating lever 21 which differs from the afore-described lever 1 by being flat. It is rotatably mounted on a supporting plate 4 by means of a shoulder pin 22 somewhat similar to the pivot pin 5. The free shaft end of the pin 22 is laterally offset to secure the pin in the plate 4. The device illustrated in FIG. 3 lacks a brake-actuating lever, but is otherwise identical with the device shown in FIGS. 1 and 2 and more fully described above.

FIG. 4 shows a mechanism identical with that described in the preceding paragraph except for a flat operating lever 31 mounted on the pin 22. A bore 32 in the lever retains a steel bearing ball 33 which is pressed into frictional engagement with the plate 4 by the spring 10. The bore 32 is radially offset from the recesses 13 in the plate 4, idle in this embodiment of the invention, so that the ball 33 cannot drop into the recesses and frictionally arrests the lever 31 in any angular position.

The hook-shaped lower end of the lever 31, identical with the end 10', but not explicitly shown in the drawing, is normally provided with a cable or other tension member which connects the lever to the derailleur of a transmission permitting a change of transmission ratios in numerous small steps. The selected transmission ratio is maintained by the frictional engagement of the ball 33 with the plate 4.

FIG. 5 shows a modification of the two-lever mechanism of FIGS. 1 and 2 in which a speed changing lever 31' for a derailleur type transmission, identical with the aforedescribed lever 31 except for a top end bent away from the brake-actuating lever 2, replaces the lever 1.

Except for the operating levers and the associated arresting elements, the several control mechanism of the invention may be entirely identical and assembled from common components, thus reducing the cost of making the components and the mechanisms assembled from the same. If a bicycle originally equipped with a derailleur type of multiple-speed transmission is changed to a multiple-speed hub, the control mechanism may readily be adapted to the change.

What is claimed is:
1. A control device for a bicycle or like vehicle having a tubular frame comprising, in combination:
 (a) a supporting plate member extending in a plane;
 (b) a control lever member;
 (c) attaching means for attaching a tension member to said lever member;
 (d) pivot means fastening said lever member to said plate member for angular movement about a pivot axis transverse to said plane;
 (e) said pivot means including securing means axially securing said lever member relative to said plate member;
 (f) a flange integral with said plate member and projecting from the same in two opposite directions,
  (1) respective portions of said flange spaced from said plate member in said opposite directions constituting receptacles for two tubular elements of said frame having substantially parallel axes; and
 (g) clamping means for clamping said elements in said receptacles.

2. A device as set forth in claim 1, further comprising a second control lever member secured to said plate member by said pivot means, said control lever members being offset from said plate member in opposite directions.

3. A device as set forth in claim 1, further comprising click stop means for releasably arresting said lever member in a selected angular position, said click stop means including a ball mounted carried by one of said members, the other member being formed with a recess positioned partly to receive said ball in said position of the lever member, and yieldably resilient means operatively connected to said one member and urging said ball to enter said recess.

4. A device as set forth in claim 3, wherein said one member is said lever member.

5. A device as set forth in claim 4, wherein said yieldably resilient means include a spring rotatably secured on said pivot means and having a free end portion remote from said pivot axis, said end portion extending into an aperture of said lever member in the direction of said pivot axis.

6. A device as set forth in claim 1, further comprising a pressure member mounted carried by said lever member for movement in the direction of said pivot axis toward and away from a position of frictional engagement with said plate member, and yieldably resilient means engaging said pressure member and urging the same to move into said position thereof.

7. A device as set forth in claim 6, wherein said yieldably resilient means include a spring rotatably secured on said pivot means and having a free end portion remote from said pivot axis, said end portion extending into an aperture of said lever member in the direction of said pivot axis.

8. A device as set forth in claim 1, further comprising a cover member extending over said plate member, said pivot means, said flange, and said clamping means, the clamping means including a clamping screw threadedly engaging said flange and having a head formed with a groove extending about the axis of the threads on said clamping screw, and a fastening member fixed on said cover member and shaped to receive said head, said fastening member having a rim engaging said groove for attaching said cover member to said plate member.

References Cited
UNITED STATES PATENTS 3,442,148  5/1969  Juy _____ 74—489 X MILTON KAUFMAN, Primary Examiner U.S. Cl. X.R.

74—489